United States Patent [19]

Suganuma et al.

[11] Patent Number: 4,810,055

[45] Date of Patent: Mar. 7, 1989

[54] HEAT RESISTING PLASTIC OPTICAL FIBER AND METHOD FOR ITS MANUFACTURE

[75] Inventors: Heiroku Suganuma, Otsu; Shoshiro Taneichi, Kyoto; Hisaaki Kobayashi; Tadayo Matsunaga, both of Otsu, all of Japan

[73] Assignee: Toray Industries, Inc., Tokyo, Japan

[21] Appl. No.: 102,473

[22] Filed: Sep. 29, 1987

[30] Foreign Application Priority Data

Oct. 2, 1986 [JP]  Japan ................................. 61-235296
Feb. 13, 1987 [JP]  Japan ................................. 62-29707

[51] Int. Cl.$^4$ ............................................. G02B 6/16
[52] U.S. Cl. ................................. 350/96.34; 526/282; 350/96.30
[58] Field of Search ............... 350/96.34, 96.29, 96.30; 526/282

[56] References Cited

U.S. PATENT DOCUMENTS

| | | | |
|---|---|---|---|
| 4,591,626 | 5/1986 | Kawai et al. | 526/282 |
| 4,615,584 | 10/1986 | Ohmori et al. | 350/96.34 |
| 4,693,553 | 9/1987 | Sasaki et al. | 350/96.29 X |

FOREIGN PATENT DOCUMENTS

| | | | |
|---|---|---|---|
| 60-95406 | 5/1985 | Japan | 350/96.34 |
| 61-77806 | 4/1986 | Japan | 350/96.34 |
| 61-132904 | 6/1986 | Japan | 350/96.34 |
| 61-147203 | 7/1986 | Japan | 350/96.34 |

*Primary Examiner*—John D. Lee
*Attorney, Agent, or Firm*—Birch, Stewart, Kolasch & Birch

[57] ABSTRACT

An optical fiber of a sheath-core structure is disclosed. The fiber has for its core a copolymer which includes an aliphatic N-substituted maleimide as a monomer unit, and preferably methyl methacrylate as an additional monomer unit. These optical fibers have high light transmittance, good mechanical characteristics and an excellent heat-resisting durability.

19 Claims, No Drawings

HEAT RESISTING PLASTIC OPTICAL FIBER AND METHOD FOR ITS MANUFACTURE

FIELD OF THE INVENTION

This invention relates to a heat resisting plastic optical fiber with a sheath-core structure.

DESCRIPTION OF THE PRIOR ART

Conventionally, optical fibers are manufactured from quartz glass or a plastic. The quartz glass-based optical fibers have an excellent optical transmittance and, are industrially used in long distance communication applications. However, not only are their workability and flexibility deficient but also they are expensive. On the other hand, although plastic-based fibers have an inferior light transmittance, they have the advantages of excellent flexibility, light weight and excellent workability as well as low price, so that they are now increasingly used in short distance communication.

As the core component of the plastic-based optical fibers, polymethyl methacrylate is generally used. Although polymethyl methacrylate has not only transparency but also excellent characteristics in regard to weather-proofing and mechanical properties, its heat-resistance is not satisfactory. Thus, in applications in which an optical fiber is exposed to a high temperature, the upper limit of the temperature of the optical fibers employing polymethyl methacrylate as the core component is set at about 80° C., so that the demand for improving the heat-resistance is strong.

As a method of improving the heat-resistance, the following methods are known:

(1) A condensation polymer with a good transparency and a high glass transition point, such as polycarbonate, is used.

(2) Methacrylic ester having a voluminous ester group or N-arylmaleimide (Tokkai-sho No. 61-147203) is copolymerized with the methyl methacrylate.

(3) After polymerizing methyl methacrylate, intermolecular cross-linkages are formed by reacting the polymer with an amine or the like.

However, although the optical fibers employing the above (1) as the core component have a good heat-resistance, their light transmittance and heat-resisting durability are not satisfactory. This is because it is difficult to eliminate by-products produced in the polymerization reaction and the fiber is colored by the by-products or by decomposition products of the polymer.

The optical fibers employing the above (2) as the core component usually do not have satisfactory heat-resistance because the glass transition point is not sufficiently elevated. In cases where the glass transition point is to be raised by increasing the copolymerization ratio of the monomer or by incorporating an extremely voluminous functional group, satisfactory mechanical characteristics are not obtained or the heat-resisting durability is not good because the voluminous functional group is likely to decompose. Further, N-arylmaleimide is a low-volatile solid, its purification is not easy and the light transmittance is not satisfactory because of the impurities, and the amount of remaining monomers in the polymer is great, which monomers color the polymer and lower the glass transition point.

The optical fibers employing the above (3) as the core component contain a large amount of by-products and are colored, so that an optical fiber with good light transmittance cannot be obtained.

SUMMARY OF THE INVENTION

The object of the present invention is to provide a polymer for plastic optical fibers, which has high light transmittance, good mechanical characteristics, and an excellent heat-resisting durability.

This invention provides an optical fiber with a sheath-core structure, wherein the core component comprises a copolymer including N-aliphatic maleimide as a monomer unit.

DESCRIPTION OF THE PREFERRED EMBODIMENTS

The invention involves the use as a monomer component of an N-aliphatic maleimide, and among N-aliphatic maleimides those substituted with aliphatic hydrocarbons which do not have a characteristic absorption in the visible light region are preferred. Further, in view of the balance of the combination of the mechanical characteristics of the polymer, glass transition point-raising property and heat stability, substituents of the hydrocarbon series with 1 to 6 carbon atoms are preferred, which include methyl, ethyl, isopropyl, isobutyl, secondary-butyl, t-butyl, 2,2-dimethylpropyl, cyclohexyl and the like. Further, in view of the feasibility of distillation for improving the purity of the monomer, isopropyl, isobutyl, secondary-butyl, t-butyl, 2,2-dimethylpropyl and the like, which are liquid at room temperature, are especially preferred.

Among N-substituted maleimides, those substituted with an aryl compound are yellow or light yellow crystals and so they present a problem as to the light transmittance.

The most preferred second component which is copolymerized with N-substituted maleimide is methyl methacrylate. However, the invention is not restricted thereto and any comonomer may be used as long as it has a copolymerization compatibility with the N-aliphatic maleimide. Further, copolymerizing a third component, different from the second component, such as methyl acrylate and styrene, is also included within the scope of the present invention. Moreover, adding a trace amount of heat stabilizer or antioxidant, which does not degrade the light transmittance, is also included within the scope of the present invention.

A preferable copolymerization ratio for good mechanical properties is 5–70% of aliphatic N-substituted maleimide, and 30–95% of comonomer. More preferably, the amount of aliphatic N-substituted maleimide should be 10–50%. If the amount of N-substituted maleimide is lower than 5%, sufficient heat resistance cannot be attained, and if it is higher than 70%, mechanical properties of the fiber are greatly lowered. A preferred material comprises 5–70% of N-aliphatic maleimide and 30–95% of methyl methacrylate units. All percentages are given by weight.

In regard to the polymerization method of the core component polymer, bulk polymerization or solution polymerization is preferable because each gives high light transmittance to the obtained polymer.

Examples of the solvent for solution polymerization include hydrocarbons such as toluene and xylene; ester compounds such as butyl acetate; and ether compounds such as dioxane. The solvent is not restricted to these compounds and any solvent which is inactive against the polymerization reaction and which can dissolve the monomers and the polymer may be used. For obtaining uniform quality of the polymer, continuous polymerization is better, but, of course, batch polymerization can be applied. A continuous polymerization in which all of the material components such as the monomer, polymerization initiator, molecular weight controlling agent and solvent are continuously fed in a stirred reaction medium is most preferable. 90°–160 ° C. is preferable as the polymerization temperature and 10–500 poise is preferable as the viscosity of the reaction medium.

Ordinary polymerization initiators, for example, azo compounds such as azo-t-butane and azo-t-octane, or organic peroxides such as di-t-butylperoxide and di-t-butylperbenzoate are preferably used.

As molecular weight controlling agents, mercaptans such as n-propyl-, n-butyl-, n-hexyl-, n-dodecyl-, i-butyl-, i-pentyl-, t-butyl-, and t-hexyl mercaptan can be used. However, molecular weight can also be controlled by changing the amount of the polymerization initiator.

A polymerization initiator and molecular weight controlling agent can be added to the monomer or solvent prior to introducing them into the reaction bath.

In cases in which a polymer is produced by copolymerization as in the present invention, a solution or bulk polymerization process is preferable, as shown in U.S. Pat. No. 4,324,868. However, a solution polymerization with a high polymerization ratio is better than a bulk polymerization process in which a recovered monomer mixture is subjected to a fractional distillation, since the former has a higher productivity and the amount of the remaining high boiling monomers which are the cause of the lowering of the glass transition point and thermal coloration is smaller in the former process. This is important when a polymer has a boiling point higher than 180° C. at atmospheric pressure, or higher than 120° C. at 100 mmHg. The preferable amount of the solvent is 10 to 50 wt. %, more preferably 15 to 40 wt. % based on the total weight of the polymerization mixture (including solvent).

The thus obtained polymer solution is subjected to a monomer-elimination step to remove volatiles such as unreacted monomers.

The volatile component contained in the thus obtained polymer solution should preferably be eliminated to less than 2 wt. % because volatile components lower the glass transition temperature of the core. It is preferable that the number average molecular weight of the core component measured by an osmotic method is $2 \times 10^4$ to $5 \times 10^5$.

Thereafter, the polymer can be supplied to the core component feed of a composite spinning machine with a sheath-core type spinneret to be joined with a polymer of the sheath component from the sheath component feed to form a plastic optical fiber core-sheath structure.

As a sheath component, a polymer having a refractive index which is at least 2% lower than that of the core component is preferable. For example, a polymer or copolymer of fluoroalkylmethacrylate, fluoroalkyl α-fluoroacrylate and fluoroolefin is preferable.

For increasing heat resistance, further coating of the sheath-core type optical fiber is effective. As coating materials, polyolefins such as polyethylene, polypropylene, crosslinked polyolefin, polyvinylchloride, polyamides such as Nylon 12 or polyester elastomers such as polyethylene/methylene terephthalate copolymer may be used. Further, direct formation of a concentric three layer structure by a spinning process as disclosed in Laid-open Japanese Patent Publication No. 18608/83 can also be applied.

The plastic optical fiber of the present invention has a much better heat-resisting durability than the conventional optical fiber including polymethyl methacrylate as a core component, while keeping light transmittance and mechanical characteristics comparable to those of the conventional optical fiber.

Therefore, the plastic optical fiber of the present invention can be used in fields such as the engine compartment of an automobile, in which heat-resistance is required for a long time and in which the conventional optical fibers cannot be used. Thus, the present invention has great industrial significance and value.

The present invention will now be described more concretely by way of the examples thereof.

The light transmittance was evaluated in the examples as follows:

A light beam from a tungsten lamp was divided by a diffraction grating and was unified by a lens. The light was introduced into the end of a sample optical fiber with a length of 10 m–30 m of which both ends had been polished, and the light from the other end of the fiber was detected as photoelectric power by a photodiode. The light was measured employing a so called cut back method in which the fiber was cut at about 2 m from the light-impinging end of the fiber to give a reference fiber and the measurement of the light from the other end of the fiber was repeated. The loss of light transmittance was calculated according to the following equation:

Loss $(dB/km) = (Pr - Ps)/(Ls - Lr)0.1000$ wherein
L: length of fiber
P: photoelectric power (dBm)
s: sample fiber
r: reference fiber The heat-resistant durability was evaluated as follows:

The optical fiber subjected to the above-mentioned measurement was heated in a hot blast drier for a prescribed time. Thereafter, the loss of light transmittance was determined according to the above method and the loss of light transmittance before and after the heat treatment were compared.

EXAMPLE 1

A mixture of

| | |
|---|---|
| N—isopropyl maleimide | 200 wt parts |
| Methyl methacrylate | 466.7 wt parts |
| n-butyl mercaptan | 0.82 wt parts |
| azo-t-butane | 0.87 wt parts | was prepared after distilling each of the components, and the mixture was fed into a polymerization bath after filtering through a Teflon filter with a pore diameter of 0.05 μm. After polymerizing the mixture at 130° C. for 16 hours under nitrogen pressure, the mixture was gradually heated to 180° C. and was held at this temperature for 16 hours to complete the polymerization and to completely decompose the polymerization initiator.

The mixture was further heated to 230° C. and was retained at this temperature for 1 hour. Thereafter, the mixture was gradually introduced into a monomer-eliminating step under nitrogen pressure to remove unreacted monomers to obtain a polymer. Then the vessel was connected to a composite spinning machine having a sheath-core type spinneret.

On the other hand, as a sheath component, tetrafluoropropyl α-fluoroacrylate/trifluoroethyl α-fluoroacrylate copolymer (85/15 by wt) was melted at 210° C. and was supplied to the spinneret.

The mixture was spun at a spinning temperature of 230° C., at a take up speed of 5 m/min. and was drawn 2.0 times of the original length at 160° C., to obtain a sheath-core type fiber with a core radius of 980 μm and a sheath thickness of 10 μm. This fiber was made into a cord by coating the fiber with polypropylene.

The polymer after the monomer-eliminating step had remanent monomers in an amount of 0.18 wt. % as determined by GC measurement, and the glass transition point as determined by DSC measurement was 136° C.

The loss of light transmittance at 25 ° C. of the optical fiber made into a cord was 210 dB/km at 660 nm, and that after a heat treatment at 125° C. for 1000 hours was 220 dB/km at 660 nm, and thus the loss of light transmittance was not changed significantly. Further, the flexibility of the fiber was so great that the fiber was able to be satisfactorily wound around a rod with a diameter of 1 mm. Thus, a plastic optical fiber having an excellent heat-resistance while maintaining good light transmittance and mechanical characteristics, which are comparable to those of methyl methacrylate, was obtained.

EXAMPLE 2

Optical fibers were obtained in the same manner as Example 1 except that the monomer composition was changed as shown in Table 1.

The properties are shown in Table 1.

EXAMPLE 3 and COMPARATIVE EXAMPLE 1

Optical fibers were obtained in the same manner as Example 1 except that the monomer composition of the sheath was changed to tetrafluoropropyl a-fluoroacrylate and methyl methacrylate (85/15 in weight).

EXAMPLE 4

Optical fibers were obtained in the same manner as Example 1 except that the monomer composition of the core was changed as shown in Table 1 and solution polymerization was conducted after adding the monomer mixture to toluene to a monomer concentration of 70 wt. % with respect to the whole mixture.

EXAMPLE 5, COMPARATIVE EXAMPLES 2 and 3

Optical fibers were obtained in the same manner as Example 4 except that the monomer composition of the core was changed as shown in Table 1 and the monomer composition of the sheath was changed to tetrafluoropropyl α-fluoroacrylate and methyl mathacrylate (85/15 in weight), and in Example 5 and Comparative Example 3, n-butyl mercaptan was not contained.

EXAMPLE 6

A mixture of

| | |
|---|---|
| N—isopropyl maleimide | 24.5 wt % |
| Methyl methacrylate | 45.5 wt % |
| azo-t-octane | 0.052 wt % |
| toluene | 30.0 wt % | was fed to a polymerization bath at a rate of 5 kg/hour while filtering the mixture through a Teflon filter with a pore diameter of 0.1 μm. The polymerization temperature was 135° C., and the liquid level was controlled so as to obtain an average dwelling time of 4 hours. The reacted polymer solution was discharged by a metering pump at a rate of 5 kg/hour. This solution was supplied to an extruder with a vent, and the unreacted monomers and the solvent were removed at 190° C.–250° C., at 250–2 torr. The solution was then introduced into a sheath-core type fiber spinning machine as a core component.

After this, the procedure in Example 1 was followed to obtain an optical fiber.

The reaction ratio of the polymer from the polymerization bath was 90 wt. % as determined by GC measurement, and the copolymer contained 33 wt. % of N-isopropyl maleimide units as determined by elementary analysis.

EXAMPLE 7

Optical fibers were obtained in the same manner as in Example 6, except that the monomer composition of the core was changed as shown in Table 1, the content of azo-t-octane was adjusted to 0.026 wt. %, and the monomer composition of the sheath was changed to tetrafluoropropyl α-fluoroacrylate and methyl methacrylate (85/15 in weight ratio).

The polymerization ratio of the monomers was 90 wt. % and the composition of the copolymer was 21.5:34.0:44.5 (cyclohexyl maleimide: methyl methacrylate: styrene) by weight.

TABLE 1

| | Monomer Comp. (in Weight) | | | | | Polymer Properties | |
|---|---|---|---|---|---|---|---|
| | N-substd. Maleimide | | Me. Methacrylate | 3rd-Mono. | Polymerizn. Process | Remaining Monomer Ratio (wt %) | Glass Transion Point (°C.) |
| | Substnt. | Comp. | | | | | |
| Ex. 2 | iPr | 40.0 | 60 | 0 | Batch, Bulk | 0.32 | 145 |
| Ex. 3 | tBu | 21.3 | 78.7 | 0 | Batch, Bulk | 0.25 | 138 |
| Ex. 4 | iPr | 30.0 | 67.0 | MA:3.0 | Batch, Sol. | 0.10 | 133 |
| Ex. 5 | cHe | 23.6 | 30.7 | St:45.7 | Batch, Sol. | 0.11 | 138 |
| Ex. 6 | iPr | 35.0 | 65.0 | 0 | Cont., Sol. | 0.05 | 136 |
| Ex. 7 | cHe | 30.4 | 29.8 | St:39.8 | Cont., Sol. | 0.14 | 146 |
| C. Ex. 1 | — | 0 | 100 | 0 | Batch, Bulk | 0.23 | 118 |
| C. Ex. 2 | Ph | 23.4 | 76.6 | 0 | Batch, Sol. | 0.13 | 136 |
| C. Ex. 3 | MANH | 14.5 | 34.4 | St:51.1 | Batch, Sol. | 0.10 | 135 |

| | Optical Fiber Properties | | |
|---|---|---|---|
| | Loss of Light Transmittance (660 nm) 25° C., dB/km | Heat-Resistant Durability 125° C., 1000 hours, dB/km | Flexibility mm |
| Ex. 2 | 231 | 245 | 3 |

TABLE 1-continued

|       |      |      |    |
|-------|------|------|----|
| Ex. 3 | 242  | 262  | 3  |
| Ex. 4 | 221  | 232  | 1  |
| Ex. 5 | 295  | 311  | 3  |
| Ex. 6 | 200  | 208  | 1  |
| Ex. 7 | 240  | 253  | 3  |
| C. Ex. 1 | 180 | — | <1 |
| C. Ex. 2 | 1510 | 1710 | 3 |
| C. Ex. 3 | 930 | 7520 | 5 |

Substituents: iPr; isopropyl  tBu; t-butyl  cHe; cyclohexyl  Ph; phenyl  MANH; Maleic Anhydride
3rd Monomer: MA; methyl acrylate  St; styrene

We claim:

1. A heat resisting plastic optical fiber with a sheath-core structure, comprising a sheath component and a core component, wherein said core component comprises a copolymer consisting essentially of 5–70 wt. % of an N-aliphatic maleimide with 30–95 wt. % of methylmethacrylate and/or styrene as monomer units.

2. A heat resisting plastic optical fiber according to claim 1, wherein the copolymer is a copolymer consisting essentially of 10–50 wt. % of N-aliphatic maleimide and 50–90 wt. % of methylmethacrylate and/or styrene as monomer units.

3. A heat resisting plastic optical fiber according to claim 1, wherein the aliphatic group is a group having 1–6 carbon atoms.

4. A heat resisting plastic optical fiber according to claim 1, wherein the aliphatic group is at least one group selected from the group consisting of isopropyl, isobutyl, secondary-butyl, t-butyl and a 2,2-dimethylpropyl group.

5. A heat resisting plastic optical fiber according to claim 4, wherein the aliphatic group is an isopropyl group.

6. A heat resisting plastic optical fiber according to claim 1, wherein the optical fiber contains a stabilizer or an antioxidant.

7. A heat resisting plastic optical fiber according claim 1, wherein the sheath component is a copolymer of tetrafluoropropyl α-fluoroacrylate and methyl methacrylate.

8. A heat resistant plastic optical fiber according to claim 1, wherein the sheath component is a copolymer of tetrafluoropropyl α-fluoroacrylate and trifluoroethyl α-fluoroacrylate.

9. A heat resisting plastic optical fiber according to claim 1, wherein the core component comprises a copolymer consisting essentially of 15–50 wt. % of a N-aliphatic maleimide and 85–50 wt. % of methylmethacrylate as monomer units.

10. A heat resisting plastic optical fiber according to claim 1, wherein said core component has a number average molecular weight of $2 \times 10^4$ to $5 \times 10^5$ as measured by an osmotic method.

11. A heat resisting plastic optical fiber according to claim 1, wherein said fiber is further coated with a member selected form the group consisting of polyethylene, polypropylene, crosslinked polyolefin, polyvinylchloride, nylon 12, and polyethylene/methylene terephthalate copolymer.

12. A heat resisting plastic optical fiber according to claim 1, wherein said copolymer consists essentially of N-isopropyl maleimide and methyl methacrylate.

13. A mtehod of making a heat resisting plastic optical fiber, comprising the continuous steps of
solution, copolymerizing N-aliphatic maleimide with methylmethacrylate and/or styrene wherein the amount of a solvent is 10 to 45% by weight based on the total amount of the polymerization mixture;
evaporating volatile components from the produced polymer; and
spinning said polymer as a core component with a sheath component in a composite spinning machine with a sheath-core type spinneret to produce a heat resisting plastic optical fiber.

14. A method of making a heat resisting plastic optical fiber according to claim 13, wherein a hydrocarbon is used as the solvent for the solution copolymerization step.

15. A method of making heat resisting plastic optical fiber according to claim 13, wherein at least one compound selected from the group consisting of toluene, xylene, butyl acetate and dioxane is used as a solvent of the solution copolymerization.

16. A method of making a heat resisting plastic optical fiber according to claim 13, wherein the aliphatic group is at least one group selected from the group consisting of isopropyl isobutyl, secondary-butyl, t-butyl and 2,2-dimethylpropyl group.

17. A method of making a heat resisting plastic optical fiber according to claim 16, wherein the aliphatic group is an isopropyl group.

18. A method of making a heat resisting plastic optical fiber according to claim 13, wherein the sheath component is a copolymer of tetrafluoropropyl α-fluoroacrylate and methyl methacrylate.

19. A method of making a heat resisting plastic optical fiber according to claim 13, wherein the sheath component is a copolymer of tetrafluoropropyl α-fluoroacrylate and trifluoroethyl α-fluoroacrylate.

* * * * *